US010262211B2

(12) United States Patent
Govindasamy (10) Patent No.: US 10,262,211 B2
(45) Date of Patent: Apr. 16, 2019

(54) WINDSHIELD AND A METHOD FOR MITIGATING GLARE FROM A WINDSHIELD OF AN AUTOMOBILE

(71) Applicant: Wipro Limited, Bangalore (IN)

(72) Inventor: Sathish Govindasamy, Vellore (IN)

(73) Assignee: WIPRO LIMITED, Bangalore (IN)

( * ) Notice: Subject to any disclaimer, the term of this patent is extended or adjusted under 35 U.S.C. 154(b) by 39 days.

(21) Appl. No.: 15/355,133

(22) Filed: Nov. 18, 2016

(65) Prior Publication Data

US 2018/0089516 A1  Mar. 29, 2018

(30) Foreign Application Priority Data

Sep. 28, 2016  (IN) .............................. 201641033208

(51) Int. Cl.
  *G06K 9/00* (2006.01)
  *G06K 9/62* (2006.01)
  (Continued)

(52) U.S. Cl.
  CPC .......... *G06K 9/00791* (2013.01); *B60J 3/04* (2013.01); *G06K 9/0061* (2013.01);
  (Continued)

(58) Field of Classification Search
  CPC ........... G06T 2207/20021; G06T 2207/30261
  See application file for complete search history.

(56) References Cited

U.S. PATENT DOCUMENTS 3,695,681 A   10/1972   Dockery
5,258,607 A   11/1993   Agostini et al.
(Continued)

FOREIGN PATENT DOCUMENTS

DE  10 2012 205 429   10/2013
EP        3 028 885    6/2016
(Continued)

OTHER PUBLICATIONS

Extended European Search Report issued in the European Patent Office in counterpart European Application No. 16207203.7, dated Jul. 26, 2017, 9 pages.

*Primary Examiner* — Oneal R Mistry
(74) *Attorney, Agent, or Firm* — Finnegan, Henderson, Farabow, Garrett & Dunner, LLP (57) ABSTRACT

Disclosed herein is a method for mitigating glare from a windshield of an automobile. Plurality of images, captured from plurality of image capturing devices placed at predefined locations of automobile, are collected. Various image processing techniques are applied on the plurality of collected images to identify line of sight of driver of the automobile, presence of glare on the windshield and position of glare. A free floating opaque matter placed within the windshield is moved to the position of glare on windshield, thereby preventing the glare from affecting the driver. Movement of opaque matter on to the position of the glare is achieved by varying electrostatic potential to be applied across metal frame encircling the windshield. The windshield disclosed hereinabove is capable of adaptively positioning the opaque matter over the position of the glare without requiring any intervention from the driver, thereby facilitating in a smooth drive of the automobile.

7 Claims, 7 Drawing Sheets

(51) Int. Cl.
*G06T 7/00* (2017.01)
*G06K 9/46* (2006.01)
*H04N 5/225* (2006.01)
*B60J 3/04* (2006.01)

(52) U.S. Cl.
CPC ......... *G06K 9/4661* (2013.01); *G06K 9/6267* (2013.01); *G06T 7/004* (2013.01); *H04N 5/2252* (2013.01); *G06T 2207/20021* (2013.01); *G06T 2207/30261* (2013.01)

(56) References Cited

U.S. PATENT DOCUMENTS

| | | | |
|---|---|---|---|
| 5,305,012 | A | 4/1994 | Faris |
| 2006/0175859 | A1 | 8/2006 | Isaac |
| 2008/0294315 | A1* | 11/2008 | Breed ............ B60N 2/002 701/49 |
| 2009/0021581 | A1* | 1/2009 | Sun ............ G06K 9/00825 348/148 |
| 2009/0168185 | A1 | 7/2009 | Augustine |
| 2010/0020170 | A1* | 1/2010 | Higgins-Luthman ............ B60Q 1/1423 348/135 |
| 2010/0094501 | A1 | 4/2010 | Kwok |
| 2013/0147936 | A1 | 6/2013 | Lee et al. |
| 2016/0264063 | A1* | 9/2016 | Toma ............ B60R 11/04 |
| 2016/0339768 | A1* | 11/2016 | Ro ............ B60J 3/04 |

FOREIGN PATENT DOCUMENTS

| | | |
|---|---|---|
| JP | 2000-108660 | 4/2000 |
| WO | WO 2013/095359 | 6/2013 |

\* cited by examiner

WINDSHIELD AND A METHOD FOR MITIGATING GLARE FROM A WINDSHIELD OF AN AUTOMOBILE

TECHNICAL FIELD

The present subject matter is related, in general to minimizing effects of glare, and more particularly, but not exclusively to a windshield and a method for mitigating glare from a windshield of an automobile.

BACKGROUND

Recent surveys on road accidents reveal that, other than high speeding vehicles and drink & drive circumstances, headlamp glare has been one of the major causes of road accidents. The risk of a road accident is further amplified by poor road condition. To avoid accidents due to headlamp glare, a driver can do a very little except moving his eye direction away from the direction of glare. However, moving away from the direction of glare will not help the driver much, since by taking his eyes away from the road, the driver will not be able to have a proper view of the road in front of the automobile, which may further enhance the chances of road accidents.

The existing approaches for minimizing the effect of glare on the windshield and/or driver includes use of sun visors and various types of improved windshields, like tilted base windshield, to mitigate the effect of glare. However, it has been observed that, use of sun visors and windshields works well only during the day time and fails to reduce the effect of glare during night time or during low light conditions such as dusk/dawn, rainy or cloudy conditions. Further, use of improved windshields, like the tilted base windshield, may block the objects which the driver wants to see for smooth driving.

SUMMARY

Disclosed herein is a method for mitigating glare from a windshield of an automobile. The method comprises the steps of receiving, by a glare mitigation system, a plurality of images from each of plurality of image capturing devices placed at predefined locations of an automobile. Upon receiving the plurality of images, line of sight of the driver of the automobile is determined based on one of the plurality of images. After determining the line of sight of the driver, the method comprises determining position of the glare based on location of each of the plurality of image capturing devices, resolution of each of the plurality of images and reference point of the windshield. Finally, a free floating opaque matter present within the windshield is positioned over the position of the glare for mitigating the glare from the windshield.

Further, the present disclosure discloses a windshield comprising a first layer of a solid transparent material and a second layer of the solid transparent material. The second layer of the solid transparent material is placed adjacent to the first layer. A region between the first layer and the second layer is provided with a liquid transparent material and a free floating opaque matter. Further, edges of the first layer and the second layer are enclosed within a metal frame. The metal frame is connectable to an electrostatic power source in the automobile. The windshield is connected to a control unit, associated with the electrostatic power source, wherein the control unit controls the electrostatic potential to be applied across the metal frame, thereby causing the movement of the free floating opaque matter to the position of the glare for mitigating the glare from the windshield.

Furthermore, the present disclosure discloses a glare mitigation system for mitigating glare from a windshield of an automobile. The glare mitigation system adaptively positions the free floating opaque matter over position of glare on the windshield by varying electrostatic potential from the electrostatic power source across the metal frame for mitigating the glare from the windshield.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method of mitigating glare from a windshield of an automobile. Plurality of image capturing devices are placed and/or configured at one or more predefined locations of the automobile to capture plurality of images of a view in front of the automobile and front view of a driver of the automobile. As an example, the plurality of image capturing devices may include, without limiting to, a portable Complementary Metal-oxide Semiconductor (CMOS) image sensor, micro digital camera etc. In one embodiment, one of the plurality of image capturing devices may be placed adjacent/near the location of the driver to capture one or more images of road in front of the automobile, as viewed by the driver. Further, the one of the plurality of image capturing devices placed adjacent to the driver essentially captures the glare light from being transmitted from the vehicles traversing in front of the automobile.

In an embodiment, rest of the plurality of image capturing devices may be placed on the windshield for capturing images of the driver's eye and to capture one or more images of the road ahead of the automobile. In an example, one of the plurality of image capturing devices placed in the direction of the driver may capture one or more images of the eye of the driver. The one or more images of the driver's eye may be used to identify line of sight of the user.

Further, each of the plurality of images, except the one or more images of the front view of the driver (referred as another of the plurality of images hereinafter), may be used to verify the presence of the glare on the windshield. In one implementation, the glare is verified to be present along the line of sight of the driver when the intensity of the light in the another of the plurality of images is higher than a threshold intensity value. Upon verifying that the glare is present along the line of sight of the driver, each of the plurality of images are further processed to determine position of the glare on the windshield. In an embodiment, the position of the glare is determined based on the location of each of the plurality of image capturing devices, resolution of each of the plurality of images and a reference point of the windshield.

In an embodiment, upon determining the position of the glare, a control unit associated with the windshield and/or the glare mitigation system causes a free floating opaque matter present within the windshield to move over the position of the glare for mitigating the glare from the windshield. As an example, the free floating opaque matter present within the windshield may be a semi-solid material that has appropriate level of opacity and offers minimum resistance when being moved over the position of the glare. In one implementation, the control unit may be disposed in communication with an electrostatic power source in the automobile. The control unit uses the electrostatic power source to apply a varied range of electrostatic potentials across metal frame encircling the windshield. The varied range of electrostatic potential applied across the metal frame causes the movement of the free floating opaque matter to the position of the glare, thereby mitigating the glare and its effect on the driver.

Figure 1A:
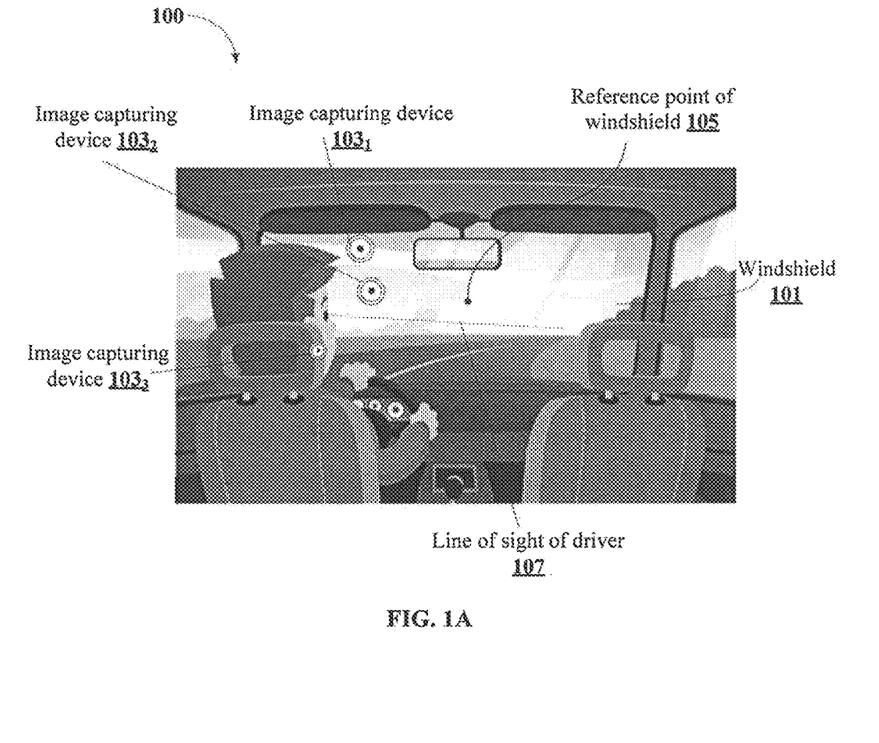
FIG. 1A shows an exemplary representation of the interior of an automobile in accordance with some embodiments of the present disclosure.

FIG. 1A shows an exemplary representation of the interior of an automobile in accordance with some embodiments of the present disclosure.

Accordingly, the environment 100 comprises a windshield 101 and a plurality of image capturing devices 103 placed at predefined locations in the automobile. In one implementation, as shown in FIG. 1A, an image capturing device $103_1$ may be placed on a corner of the windshield 101 at a location L1, for capturing an image of the road ahead of the automobile. In an implementation, the image capturing device $103_1$ may be a pair of generic two-dimensional image sensor that is capable of acquiring two-dimensional images of the road ahead of the automobile from two different viewpoints. Similarly, an image capturing device $103_2$ may be placed in the direction of the driver, at a location L2, for capturing the front view of the driver. In one implementation, the image capturing device $103_2$ may be rigidly attached to the upper front region of the windshield 101 for capturing a better image of the front view of the driver.

Similarly, an image capturing device $103_3$ may be placed at a location L3, adjacent to the location of the driver for capturing the image of the road ahead of the automobile, as seen by the driver. Further, the one or more images captured by the image capturing device $103_3$ may be analyzed to identify the position of the glare as perceived by the driver. In an embodiment, the locations of each of the plurality of image capturing devices 103 is not limited to the representation in FIG. 1A, instead, may be dynamically changed. As an example, the plurality of image capturing devices 103 may include, without limiting to, a portable Complementary Metal-oxide Semiconductor (CMOS) image sensor or a micro digital camera.

In an embodiment, the one or more images captured by the image capturing device (L2) $103_2$ may be used to determine the line of sight 107 of the driver. The line of sight 107 of the driver may be used as a reference for verifying whether the glare has fallen on the eyes of the driver, blocking the driver from viewing the road ahead of the automobile. The line of sight 107 of the driver may be determined by one of an existing line of sight detection technique based on the one or more images captured from the image capturing device $103_2$.

In an embodiment, the reference point of the windshield 105 is a point on the windshield 101, that may be predetermined while configuring each of the plurality of image capturing devices 103. The reference point of the windshield 105 may be considered for determining the position of the glare on the windshield 101.

Figure 1B:
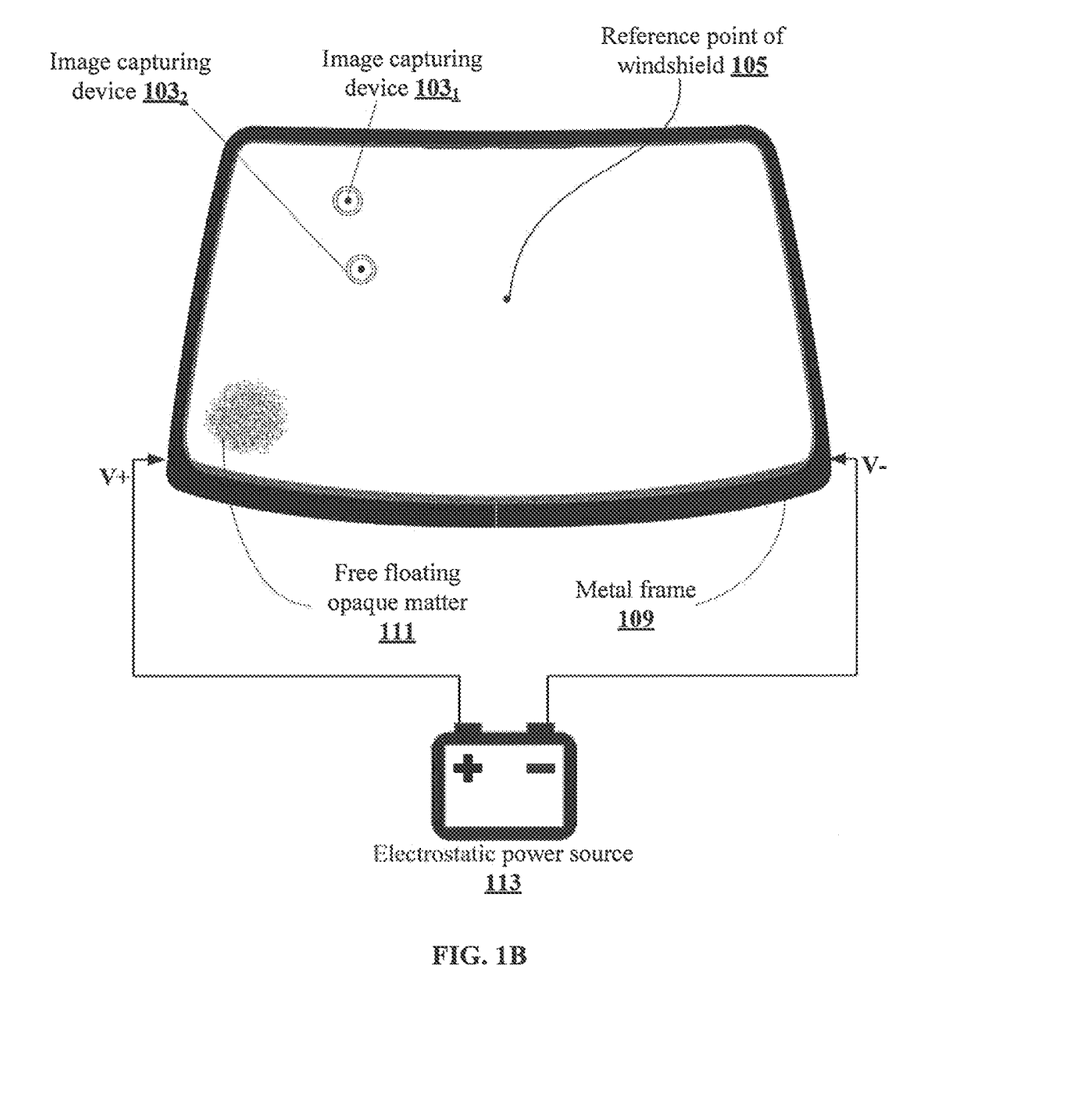
FIG. 1B illustrates a windshield in accordance with some embodiments of the present disclosure.

FIG. 1B illustrates a windshield in accordance with some embodiments of the present disclosure.

In an implementation, the windshield 101 may be made out of a first layer of solid transparent material and a second layer of the solid transparent material (not shown in FIG. 1B), which are placed adjacent to each other, such that, there is an empty region between the first layer and the second layer. The empty region between the first layer and the second layer provides a provision to store a liquid transparent material and the free floating opaque matter 111. As an example, the free floating opaque matter 111 may be made of a gel-like material, which may be fragmented into smaller fragments and the density of the material can be varied easily. Further, the first layer and the second layer of the windshield 101 are enclosed/encircled by a metal frame 109, such that, the metal frame 109 seals the liquid transparent material along with the free floating opaque matter 111 within the first layer and the second layer. In an embodiment, the metal frame 109 may be made of an electrically conductive material, such as Iron, for facilitating transmission of electrostatic potential for the movement of the free floating opaque matter 111 within the windshield 101 using the liquid transparent material. As an example, the liquid transparent material used in the windshield 101 may be transparent silica aerogel, which is transparent, non-refractive and electrically conductive. Further, any organic polymer having properties of an aerogel material may be used as the liquid transparent material in the windshield 101.

In an embodiment, the electrostatic potential required for causing the movement of the free floating opaque matter 111 is supplied from an electrostatic power source 113 associated with the automobile. Thus, the metal frame 109 encircling the windshield 101 acts as a pair of electrodes, that, when connected to the electrostatic power source 113, causes the movement of the free floating opaque matter 111 to the position of the glare by applying a varied range of electrostatic potential to the liquid transparent material.

Figure 2A:
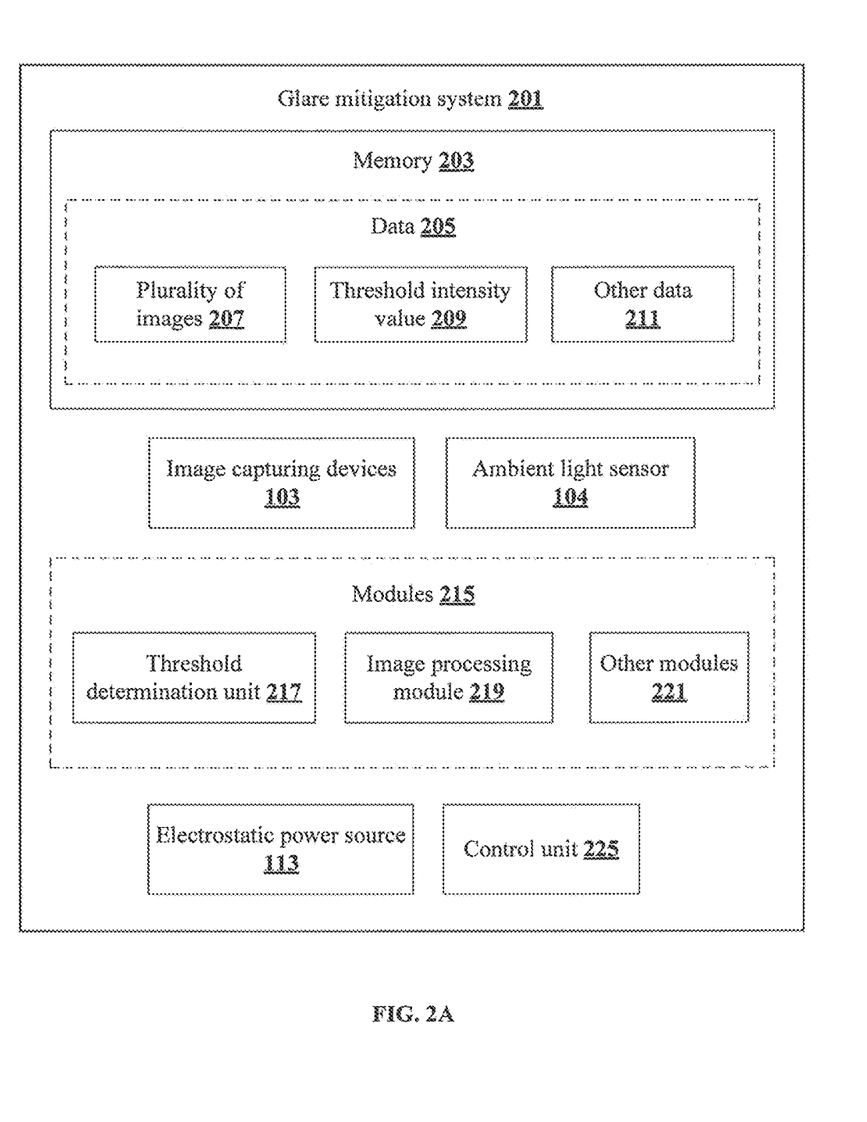
FIG. 2A shows a detailed block diagram of a glare mitigation system for mitigating glare from the windshield of the automobile in accordance with few embodiments of the present disclosure.

FIG. 2A shows a detailed block diagram of a glare mitigation system for mitigating glare from the windshield of the automobile in accordance with few embodiments of the present disclosure.

The glare mitigation system 201 comprises a memory 203, the plurality of the image capturing devices 103, an ambient light sensor 104, the electrostatic power source 113 and a control unit 225. In one implementation, the glare mitigation system 201 comprises data 205 and modules 215 for performing various operations in accordance with the embodiments of the present disclosure. In an embodiment, the data 205 may be stored within the memory 203 and may include, without limiting to, the plurality of images 207, a threshold intensity value 209 and other data 211.

In one embodiment, the data 205 may be stored in the form of various data structures. Additionally, the aforementioned data 205 can be organized using data models, such as relational or hierarchical data models. The other data 211 may store data, including temporary data and temporary files, generated by modules 215 for performing the various functions of the glare mitigation system 201.

In an embodiment, the plurality of images 207 is captured by the plurality of image capturing devices 103 placed on predefined locations of the automobile. Referring to FIG. 2A, one of the plurality of images 207, captured by the image capturing device $103_2$ may be used to determine the line of sight 107 of the driver. Similarly, another of the plurality of images 207, captured by the image capturing device $103_1$ and the image capturing device $103_3$ are used to verify the presence of glare on the windshield 101 and to determine the position of the glare on the windshield 101. In an embodiment, each of the plurality of images 207 captured by each of the plurality of image capturing devices 103 may be continuously transmitted to the image processing module 219 for real-time processing of each of the plurality of images 207.

In an embodiment, the threshold intensity value 209 is the value of intensity of the light around interior surroundings of the automobile, which is identified based on the ambient light intensity around the automobile. The threshold intensity value 209 is used to verify that the glare is present along the line of sight 107 of the driver, when the intensity of the light in the another of the plurality of images 207 is higher than the threshold intensity value 209.

In an embodiment, the ambient light sensor 104 in the glare mitigation system 201 determines the ambient light condition of the environment 100 around the automobile. Ambient light is essential in determining the threshold intensity value 209 and to determine whether a light source that has fallen on the windshield 101 is a glare or not. The ambient light sensor 104 may consist of a photodiode, and analog to digital convertor and one or more memory registers to store ambient light intensity values at periodic intervals.

In an embodiment, the data 205 may be processed by one or more modules 215 of the glare mitigation system 201. In one implementation, the one or more modules 215 may be stored as a part of the control unit 225. In another implementation, the one or more modules 215 may be communicatively coupled to the control unit 225 for performing one or more functions of the glare mitigation system 201. The modules 215 may include, without limiting to, a threshold determination unit 217, an image processing module 219 and other modules 221.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 221 may be used to perform various miscellaneous functionalities of the glare mitigation system 201. It will be appreciated that such aforementioned modules 215 may be represented as a single module or a combination of different modules.

In an embodiment, the threshold determination unit 217 may be disposed in communication with the ambient light sensor 104 for identifying the threshold intensity value 209. The threshold determination unit 217 collects the ambient light intensity values from the ambient light sensor 104 and determines the threshold intensity value 209 that has to be considered while verifying whether or not the glare is present on the windshield 101.

In an embodiment, the image processing module 219 takes each of the plurality of images 207 as input and processes each of the plurality of images 207 to determine the line of sight 107 of the driver, to verify presence of the glare on the windshield 101 and to determine the location of the glare on the windshield 101. In an implementation, the image processing module 219 processes one of the plurality of images 207, captured by the image capturing device $103_2$ to determine the line of sight 107 of the user.

In another implementation, the image processing module 219 processes the another of the plurality of images 207, captured by the image capturing devices $103_1$ and $103_3$ to determine whether a glare spot is present in the view of driver, by comparing the another of the plurality of images 207 with the output of the ambient light sensor 104. Initially, the image processing module 219 identifies the intensity of light in another of the plurality of images 207 and compares the identified intensity values with the threshold intensity value 209. Here, the glare is verified to be present on the windshield 101 if the intensity of light in another of the images is higher than the threshold intensity value 209.

Figure 2B:
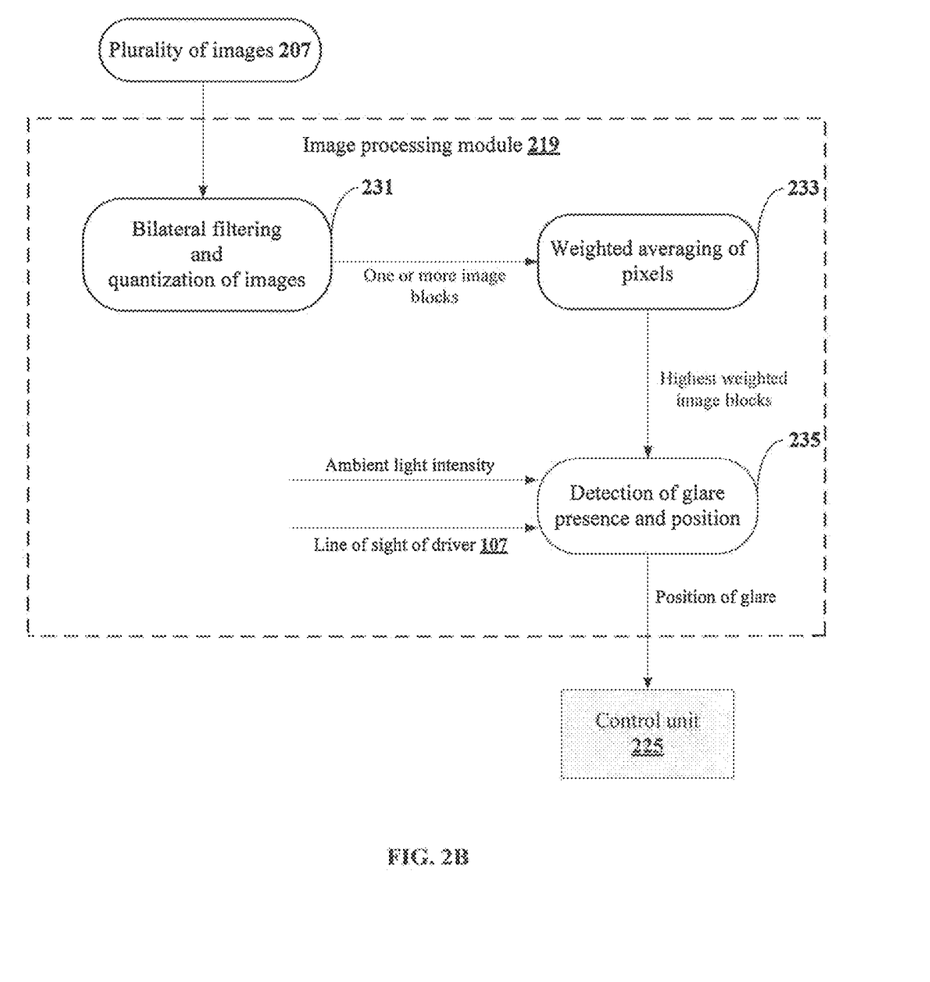
FIG. 2B shows a flowchart illustrating various operations performed by the image processing module in the glare mitigation system in accordance with some embodiments of the present disclosure.

Further, when the presence of the glare is verified, the image processing module 219 determines the position of the glare on the front view frame of the windshield 101 by considering the location of each of the plurality of image capturing devices 103, resolution of each of the plurality of images 207 and the reference point of the windshield 105, using advanced image processing techniques as illustrated in FIG. 2B.

At block 231, the image processing module 219 performs bilateral filtering and quantization on each of the plurality of images 207 to filter and quantize each of the plurality of images 207. Performing bilateral filtering on each of the plurality of images 207 enhances the clarity of the images by eliminating/reducing the noisy pixel in each of the plurality of images 207. Further, during bilateral filtering of the images, the value of intensity of light at each pixel in an image is replaced by a weighted average of value of intensity from the nearby pixels, thereby retaining only the sharp edges in the image. In an embodiment, quantization of each of the plurality of images 207 reduces the distortion in each of the plurality of images 207. As a part of quantization, each of the plurality of images 207 may be divided into plurality of image blocks having lesser block size than the original image for easy analysis of the each of the plurality of images 207. As an example, an image having 10*10 pixels' block size may be quantized into smaller image blocks of size 1*1 pixels.

At block 233, the image processing module 219 further processes each of the one or more image blocks by performing weighted averaging of pixels in each of the one or more image blocks. The weighted averaging of pixels involves replacing each pixel by the average of pixels in a square image block (For e.g.: image block of size 10*10 pixels as explained above) surrounding a pixel in order to eliminate noisy and/or high frequency pixels from each of the one or more image blocks. After performing the weighted averaging of pixels, only those image blocks that have highest weights are considered for further processing.

At block 235, the image processing module 219 analyses each of the one or more highest weighted image blocks, obtained at block 233, and compares the intensity of light in each of the one or more highest weighted image blocks with the threshold intensity value 209. The threshold intensity value 209 is dynamically determined based on the value of ambient light intensity, which is received from the ambient light sensor 104.

As an example, consider that the image captured by each of the plurality of image capturing devices 103 is given by (i,j) i,j in M, where 'M' is the resolution of the image that contains the image block having highest intensity. Now, to identify the intensity of the highest weighted image block, the image processing module 219 performs averaging on the bilateral filtered image, as may be represented by the following equation:

$$I_{avg}(k) = \frac{1}{m \times n} \sum_{i,j \text{ in } m,n} x(i, j) \text{ for the } k\text{th block}$$

Where, 'k' denotes the highest weighted image block within one of the plurality of images 207 having a resolution of 'M'. Where, (m×n) indicates the block size of the highest weighted image block.

Further, if the intensity of light in one of the one or more highest weighted image blocks exceeds the threshold intensity value 209, then it is verified that the glare is present on the windshield 101, on the location of the highest weighted image block having highest intensity. Now, the position of the glare on the windshield 101 is determined by determining the position of the image block having highest intensity. In an embodiment, the position of the image block having highest intensity may be determined based on the block size of the image block and resolution of the another of the plurality of images 207.

In an embodiment, upon determining the position of the image block having highest intensity, the position of the glare on the windshield 101 is determined based on the position of the image block having highest intensity with respect to the location of each of the plurality of image capturing devices 103 and the reference point of the windshield 105.

In an embodiment, upon determining the position of the glare, the image processing module 219 transmits the information about the position of the glare, i.e., the coordinates of the pixels of the image block having highest intensity, to the control unit 225, which in turn causes the free floating opaque matter 111 within the windshield 101 to move to the position of the glare using the process as explained in the below sections.

In an embodiment, the electrostatic power source 113 may be used to supply the electrostatic potential necessary for moving the free floating opaque matter 111 in the windshield 101. The electrostatic power source 113 is connectable to the metal frame 109 of the windshield 101. As an example, the electrostatic power source 113 may be a rechargeable 12V battery that connects to the ends of the metal frame 109.

In an embodiment, the control unit 225 in the glare mitigation system 201 may be responsible for adaptively positioning the free floating opaque matter 111 over the position of the glare on the windshield 101 upon determining the position of the glare on the windshield 101. In an implementation, the control unit 225 may be connected to the windshield 101 and the electrostatic power source 113 for varying the electrostatic potential to be applied across the metal frame 109 encircling the windshield 101, thereby causing the movement of the free floating opaque matter 111 to the position of the glare. The amount of electrostatic potential to be applied across the metal frame 109 may be determined based on the position of the glare and the position of the free floating opaque matter within the windshield 101. As an example, the initial position of the free floating opaque matter may be one of a corner of the windshield 101 and may be tracked with the help of the image capturing device 103$_1$ present near the driver. Now, the control unit 225 calculates the values of potential voltage to be applied across the metal frame 109 based on the relative position of the glare and the initial position of the free floating opaque matter on the windshield 101. Later, the control unit 225 communicates the calculated potential values to the electrostatic power source 113. The electrostatic power source 113 applies the calculated potential values on the metal frame 109, thereby causing the movement of the free floating opaque matter on to the position of the glare.

Figure 2C:
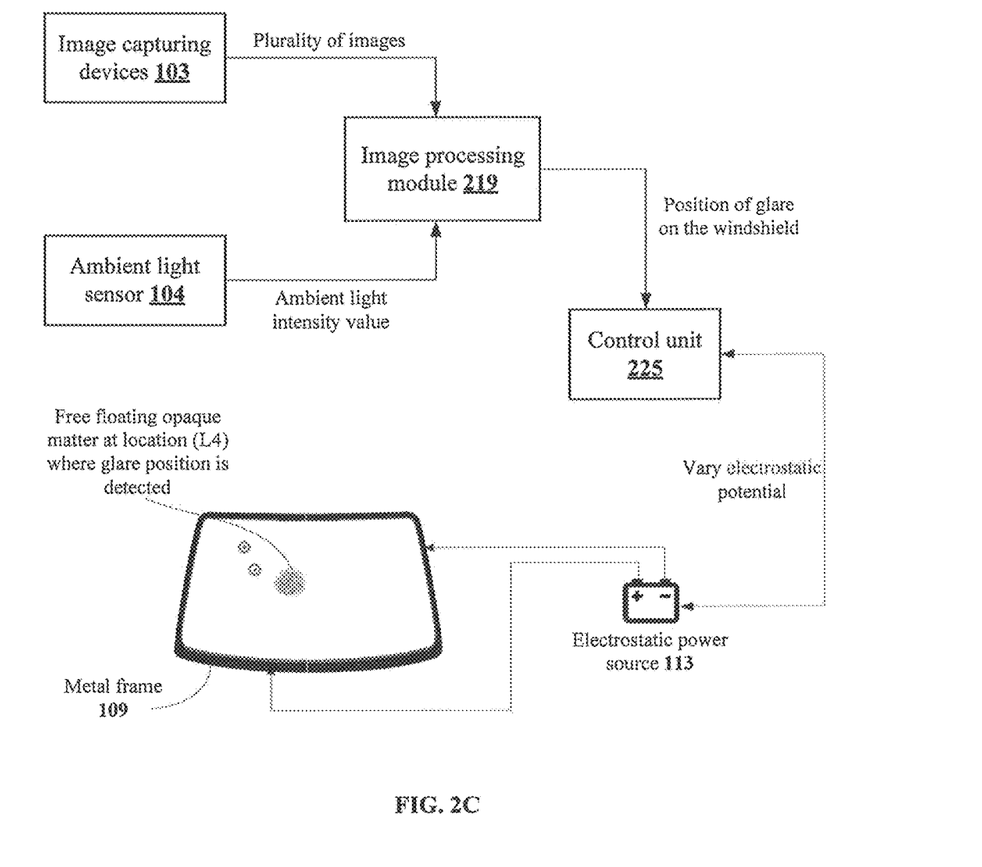
FIG. 2C shows a block diagram illustrating an exemplary arrangement for varying electrostatic potential to be applied across metal frame of the windshield in accordance with some embodiments of the present disclosure.

FIG. 2C indicates an exemplary scenario in which the control unit 225 varies the electrostatic potential applied across the metal frame 109 to move the free floating opaque matter 111 to a position (L4) on the windshield 101, when the position of the glare is determined to be (L4), thereby preventing the glare from affecting the driver. The free floating opaque matter 111 may have mild permanent static charges and can be moved across the entire windshield 101 by varying the electrostatic potential applied across the metal frames 109 into suitable range of values.

In an embodiment, the control unit 225 may vary density, shape and size of the free floating opaque matter 111 based on the intensity and shape of the glare to completely mitigate the glare from the windshield 101. The shape and/or the amount of the free floating opaque matter 111 to be moved on to the position of the glare is controlled by fragmentation of the free floating opaque matter 111 into the required size by applying suitable level of electrostatic potential. Also, the control unit 225 may adaptively adjust the position of the free floating opaque matter 111 to dynamically block the glare, for example, when the glare is due to a moving vehicle in the opposite direction of the automobile. Adaptive positioning of the free floating opaque matter 111 results in effective mitigation of the glare from the windshield 101.

In an embodiment, the use of present invention is not just limited to the windshield of an automobile, but may also be used in an eyeglass. The eyeglasses would be modified as per the invention to mitigate effect of glare on a user of the eyeglasses, for example when the user is riding a vehicle.

Figure 3:
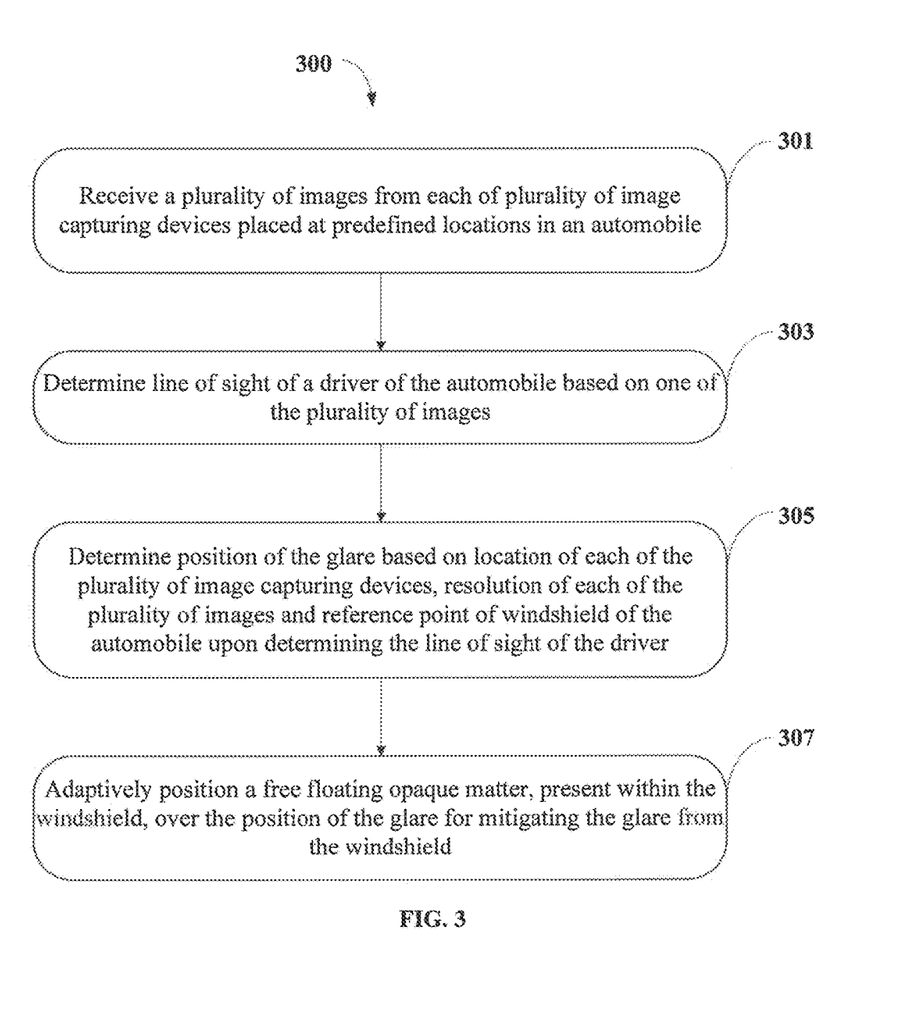
FIG. 3 shows a flowchart illustrating a method for mitigating glare from the windshield of the automobile in accordance with some embodiments of the present disclosure.

FIG. 3 shows a flowchart illustrating a method for mitigating glare from the windshield of the automobile in accordance with some embodiments of the present disclosure.

As illustrated in FIG. 3, the method 300 comprises one or more blocks for mitigating glare from a windshield 101 of an automobile using a glare mitigation system 201. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the glare mitigation system 201 receives a plurality of images 207 from each of plurality of image capturing devices 103 placed at predefined locations of an automobile.

At block 303, the glare mitigation system 201 determines line of sight 107 of a driver of the automobile based on one of the plurality of images 207. In an embodiment, the line of sight 107 of the user may be determined by applying one or more image processing techniques on one of the plurality of images 207 showing eye region of the driver. Further, the glare mitigation system 201 verifies presence of the glare on the windshield 101, along the line of sight 107 of the driver based on another of the plurality of images 207. In an embodiment, the glare may be verified to be present along the line of sight 107 of the driver when the intensity of the light in the another of the plurality of images 207 is higher than a threshold intensity value 209. The threshold intensity value 209 may be dynamically determined based on ambient light intensity around the automobile.

At block 305, the glare mitigation system 201 determines position of the glare based on location of each of the plurality of image capturing devices 103, resolution of each of the plurality of images 207 and reference point of the windshield 105 upon determining the line of sight 107 of the user. In an embodiment, the position of the glare on the windshield 101 is determined by identifying one or more image blocks, having predetermined block size, in the another of the plurality of images 207. The intensity of light in each of the one or more image blocks is compared with the intensity of light in each of other image blocks to identify an image block having highest intensity of light. Upon identifying an image block having highest intensity of light, position of the image block having the highest intensity of light is identified.

At block 307, the glare mitigation system 201 a free floating opaque matter 111, present within the windshield 101, over the position of the glare for mitigating the glare from the windshield 101. In an embodiment, adaptively positioning the free floating opaque matter 111 over the position of the glare comprises varying electrostatic potential across a metal frame 109 enclosing the windshield 101, thereby causing movement of the free floating opaque matter 111 within the windshield 101. Further, density, shape and size of the free floating opaque matter 111, to be positioned over the position of the glare, is determined based on the intensity of light, size and shape of the glare.

Computer System

Figure 4:
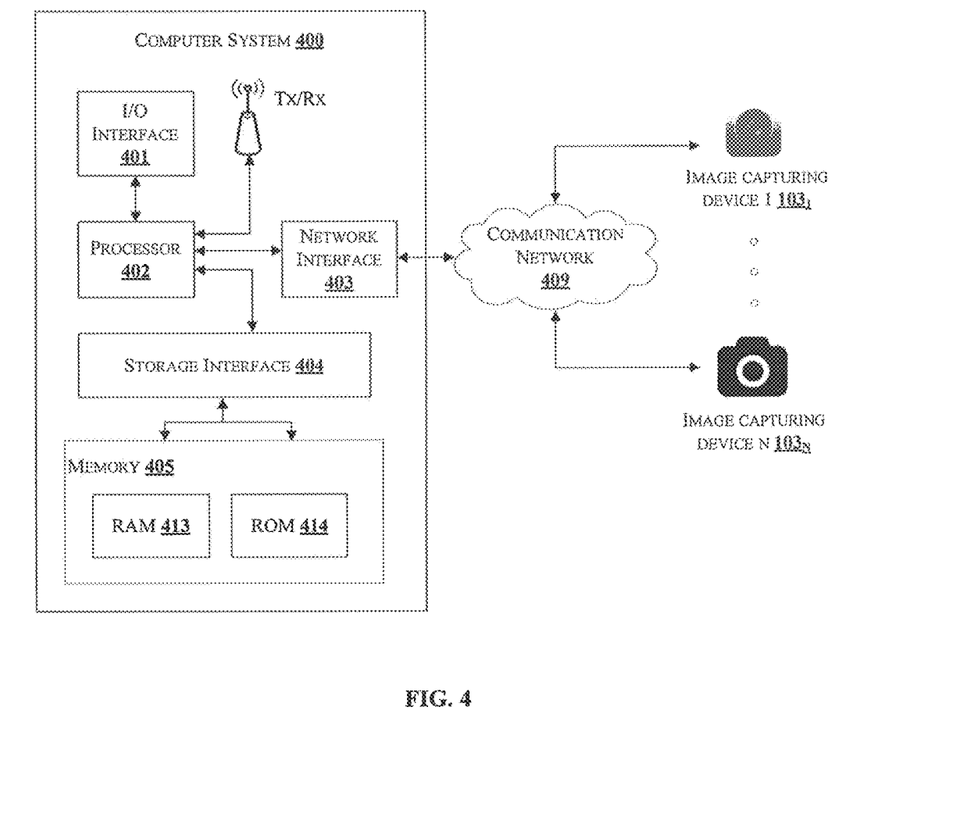
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the glare mitigation system 201 which is used for mitigating the glare from a windshield 101 of an automobile. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with the plurality of image capturing devices 103, image capturing device 1 $103_1$ to image capturing device N $103_N$ (collectively referred as image capturing devices 103) for collecting plurality of images 207. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data, an operating system etc. In some embodiments, computer system 400 may store user/application data, such as the data, variables, records, etc. as described in this invention. Such databases may be implemented as fault-tolerant, relational, scalable, secure databases such as Oracle or Sybase.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method for mitigating the effect of glare from the windshield of an automobile to the driver of the automobile.

In an embodiment, the present disclosure provides a windshield that is capable of automatically detecting the presence of glare, position of the glare and then adaptively positioning a free floating opaque matter on the position of the glare, thereby masking the presence of glare.

In an embodiment, the windshield disclosed in the present disclosure does not require any intervention from the driver during the process of mitigating the glare on the windshield, hence allowing the driver to focus on the driving without being distracted by the glare.

In an embodiment, the windshield disclosed in the present disclosure is completely transparent/clear to the driver of the automobile unlike other types of windshields, such as tinted glass windshields, designed for mitigating the glare.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Environment |
| 101 | Windshield |
| 103 | Image capturing devices |
| 104 | Ambient light sensor |
| 105 | Reference point of the windshield |
| 107 | Line of sight |
| 109 | Metal frame |
| 111 | Free floating opaque matter |
| 113 | Electrostatic power source |
| 201 | Glare mitigation system |
| 203 | Memory |

-continued

| Referral Numerals: | |
|---|---|
| Reference Number | Description |
| 205 | Data |
| 207 | Plurality of images |
| 209 | Threshold intensity value |
| 211 | Other data |
| 215 | Modules |
| 217 | Threshold determination unit |
| 219 | Image processing module |
| 221 | Other modules |
| 225 | Control unit |

What is claimed is:

1. A method for mitigating glare from a windshield of an automobile, the method comprising:
receiving, by a glare mitigation system, a plurality of images from a plurality of image capturing devices placed at predefined locations of an automobile;
determining, by the glare mitigation system, a line of sight through a windshield of a driver of the automobile based on a driver image from among the plurality of images;
determining, by the glare mitigation system, a position of a glare on the windshield caused by vehicles traversing in front of the automobile based on a location of a first image capturing device from among the plurality of image capturing devices, a resolution of a first image of the first image capturing device, and a reference point of the windshield associated with the line of sight of the driver; and
positioning, by the glare mitigation system, a free floating opaque matter within the windshield, over the position of the glare, wherein positioning the free floating opaque matter over the position of the glare comprises varying electrostatic potential across a metal frame enclosing the windshield to cause movement of the free floating opaque matter within the windshield.

2. The method as claimed in claim 1, wherein:
determining the position of the glare is further based on a location of a second image capturing device from among the plurality of image capturing devices, and a resolution of a second image from the second image capturing device.

3. The method as claimed in claim 1, wherein:
determining the position of a glare is further based on detecting an intensity of light above a threshold intensity value in the first image.

4. The method as claimed in claim 3, wherein the threshold intensity value is dynamically determined based on ambient light intensity around the automobile.

5. The method as claimed in claim 1, wherein the determining the position of the glare on the windshield further comprises:
identifying, in the first image, two or more image blocks, each having a respective block size;
identifying an image block with the highest intensity of light;
identifying the position of the image block having the highest intensity of light based on the respective block size of the image block and the resolution of the first image; and
determining the position of the glare on the windshield based on the position of the image block with respect to the reference point of the windshield and the location of the first image capturing device.

6. The method as claimed in claim 1, wherein density, shape and size of the free floating opaque matter, to be positioned over the position of the glare, is determined at least based on an intensity of light, size and shape of the glare.

7. The method of claim 1, wherein determining the line of sight comprises:
detecting the position of an eye of the driver, based on the driver image.

* * * * *